United States Patent [19]
Farris

[11] Patent Number: 5,736,833
[45] Date of Patent: Apr. 7, 1998

[54] RAPID BATTERY CHARGING CIRCUIT WITH OVERVOLTAGE SHUNT

[75] Inventor: Richard D. Farris, Wichita, Kans.

[73] Assignee: Symbios Logic Inc., Fort Collins, Colo.

[21] Appl. No.: 676,019

[22] Filed: Jun. 28, 1996

[51] Int. Cl.$^6$ .................................................. H01M 10/46
[52] U.S. Cl. ........................................ 320/21; 320/39
[58] Field of Search ........................ 320/5, 6, 11, 12, 320/20, 21, 27, 30, 39, 37

[56] References Cited

U.S. PATENT DOCUMENTS

| | | | |
|---|---|---|---|
| 3,731,474 | 5/1973 | Tsurusishi | 58/23 |
| 3,867,682 | 2/1975 | Masahiro et al. | |
| 4,021,717 | 5/1977 | Furuishi et al. | 320/39 |
| 4,031,450 | 6/1977 | Hammel et al. | 320/23 |
| 4,422,032 | 12/1983 | Kakumoto et al. | 320/39 |
| 4,897,591 | 1/1990 | Spani | 320/32 |
| 5,172,045 | 12/1992 | Takeyasu | 320/37 |
| 5,229,706 | 7/1993 | Fujiwara | 320/31 |
| 5,396,163 | 3/1995 | Nor et al. | 320/21 |
| 5,479,083 | 12/1995 | Brainard | 320/2 |
| 5,530,337 | 6/1996 | Yamamoto | 320/6 |
| 5,557,192 | 9/1996 | Tamai | 320/30 |

*Primary Examiner*—Edward Tso
*Attorney, Agent, or Firm*—Wayne P. Bailey; Daniel N. Fishman

[57] ABSTRACT

A circuit for charging a battery comprising a charging source, a transistor and a charge control device for switching the transistor. When saturated and switched on, the transistor permits flow of charge to the battery from the charging source. The charge control device senses when main power is lost and switches the transistor off to prevent discharge of the battery through the charging source. After the battery is charged the transistor provides a path of least resistance to bleed off unwanted charge from other sources thereby preventing overcharging of the battery. The circuit therefore charges a battery rapidly and prevents overcharging of the battery. The charge control device is operable from a constant supply voltage supplied by a main power source when available or from the charged battery to continue operation despite loss of main power.

14 Claims, 3 Drawing Sheets

RAPID BATTERY CHARGING CIRCUIT WITH OVERVOLTAGE SHUNT

BACKGROUND OF THE INVENTION

1. Field of the Invention

The present invention relates to the field of battery charging. More particularly, it relates to a battery charging circuit that charges a battery rapidly, prevents excessive depletion of battery charge during power loss conditions, and eliminates the risk of overcharging.

2. Discussion of Related Art

Batteries have been used in electric circuits for many years. As printed circuit boards have become popular, batteries have been soldered directly onto the printed circuit board. A typical function of such a battery is to provide backup power in the event of main power failure.

Once the battery has been discharged during a power failure, it must be recharged if expected to supply backup power during the next power outage. Generally speaking it is desirable to recharge the battery as quickly as possible. It also is desirable to avoid overcharging, which can result in battery failure.

A number of charging circuits have been used, or proposed to be used, for recharging a depleted battery on a printed circuit board. One such circuit has been disclosed by Sanyo (Lithium Battery Specification, November 1994, revised January 1996). This circuit typifies the state of the present art and uses a constant voltage supply. The battery is connected to the positive and negative terminals at the supply in series with a resistor and diode. The diode is positioned in the circuit so that it is forward biased during the charging operation. This circuit suffers from at least two disabilities. It charges the battery slowly and it does not prevent the battery from being overcharged by other voltage sources in the circuit. These and similar problems are exhibited by many charging circuits of the prior art.

It is evident from the above discussion that a need exists for an improved battery charging circuit which charges the battery quickly while reducing or eliminating the risk of overcharging.

SUMMARY OF INVENTION

The present invention solves the above and other problems, thereby advancing the state of the useful arts, by providing a battery charging circuit that is at once simple, effective, and foolproof. The battery charging circuit of the present invention comprises a source of charging voltage, a transistor control circuit, and both a transistor and resistor in series with the battery to be charged. The battery is charged quickly with no risk of overcharging from other sources.

In particular, the present invention utilizes a transistor controlled by a transistor control circuit to switch the charging circuit in such a manner as to assure rapid, complete charging, while preventing overcharging of the battery. The transistor provides a low resistance path to drain excess charging current once the battery has reached its full potential. This feature of the present invention reduces or eliminates the risk of overcharging the battery. In addition, the present invention provides the above features, and others, while permitting rapid charging of the battery due to the reduced voltage drop through the transistor as compared to the charging diode. These features are implemented with simple discrete circuits requiring no programming and operate as intended to provide the above features despite loss of main power.

It is therefore an object of this invention is to provide a charging circuit that rapidly charges a battery.

Another object of this invention is to provide a charging circuit that minimizes or eliminates the risk of overcharging while rapidly charging the battery.

Still another object of this invention is to provide a charging circuit that is simple and foolproof.

DESCRIPTION OF THE PREFERRED EMBODIMENTS

The discussion that follows is of preferred embodiments of the present invention. The discussion does not relate to the invention as a whole, nor does it define or attempt to define the metes and bounds of the invention.

Figure 1:
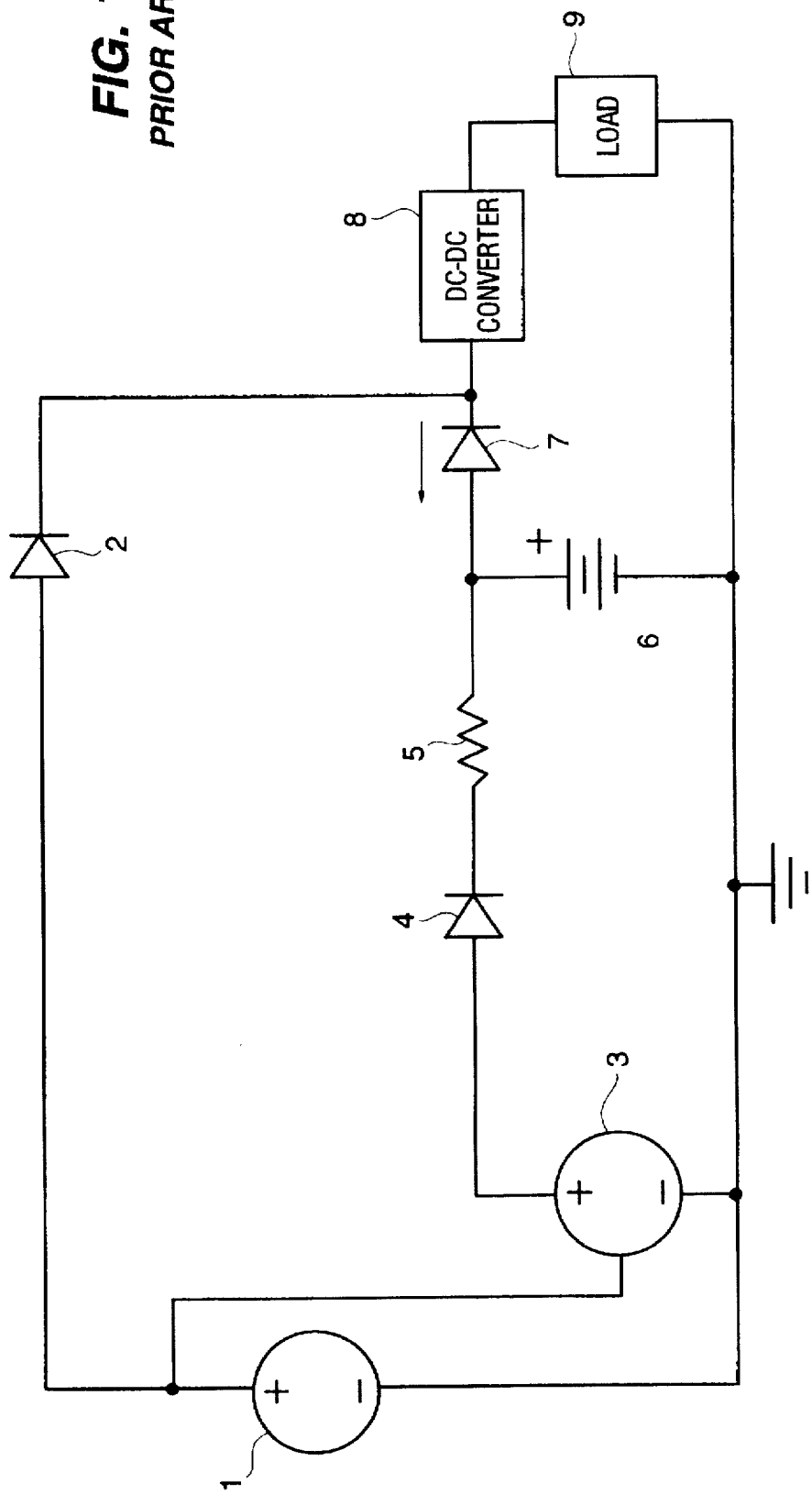
FIG. 1 is a circuit diagram of a battery charging circuit of the prior art.

FIG. 1 illustrates a charging circuit of the prior art. Main power for the circuit is provided by main power source 1. Diode 2 ensures that current from the battery 6 does not flow back into main power source in the event of a power failure.

The battery to be charged is battery 6. Power for the charging operation is supplied by battery charge source 3 which is powered by main power source 1. Battery charge source 3 is a constant voltage source with a voltage equal to the desired battery voltage when the battery is fully charged. Other elements of the charging circuit include charging diode 4 and current limit resistor 5. Diode 4 is necessary to prevent rapid discharge of battery 6 through battery charge source 3 when battery 6 is providing backup power to DC—DC converter 8 and load 9 due to main power loss. Diode 4 prevents rapid discharge of battery 6 by presenting a high resistance to current flow when the battery 6 is charged (approximately equal to the battery charging source 3 potential). Resistor 5 is necessary to help prevent the charging current from rising too high and damaging battery 6.

As battery 6 is charging, current from battery charge source 3 flows to battery 6 through forward biased charging diode 4 and current limit resistor 5. At the beginning of the charge cycle, when the battery voltage is low, the current flow is controlled largely by current limit resistor 5 because the forward voltage drop across charging diode 4 is small compared to the drop across current limit resistor 5.

As charging proceeds, the battery voltage rises quickly, even before a significant charge has been stored in the battery. As a consequence, the difference in voltage between battery charge source 3 and battery 6 diminishes, and the difference that remains is further reduced by the voltage drop across charging diode 4. Current flow to battery 6 quickly decreases to a low value.

The forward drop across charging diode 4 is a significant impediment to the speed of the charging process. As the battery 6 potential rises toward the battery charge source potential 3, the resistance of diode 4 to current flow rises in response to the decreased forward bias potential of diode 4. This further reduces the current flowing into the battery 6 slowing the battery charge time to attain full charge. These aspects of charging diode 4 make the conventional circuit charging time relatively long.

Another difficulty with the conventional circuit is that battery 6 can become overcharged. In normal operation of the circuit, main power source 1 supplies power to load 9 through DC—DC converter 8, which converts voltage to the level required by load 9. When main power source 1 fails, battery 6 supplies voltage to load 9 though battery discharge diode 7 and DC—DC converter 8. Discharge diode 7 is forward biased during a main power failure and therefore presents a large resistance to reverse current flow. This ensures that current flows principally from battery 6 to load 9 through DC—DC converter 8 when main power fails.

In normal operation, however, discharge diode 7 is reversed biased because the main power source 1 potential is higher than the battery 6 potential. Though diode 7 is reversed biased (presenting a significant resistance to current flow), diode 7 still permits current flow to leak through the diode to battery 6. Even this relatively small leakage current through reverse biased diode 7 can overcharge the battery 6.

Figure 2:
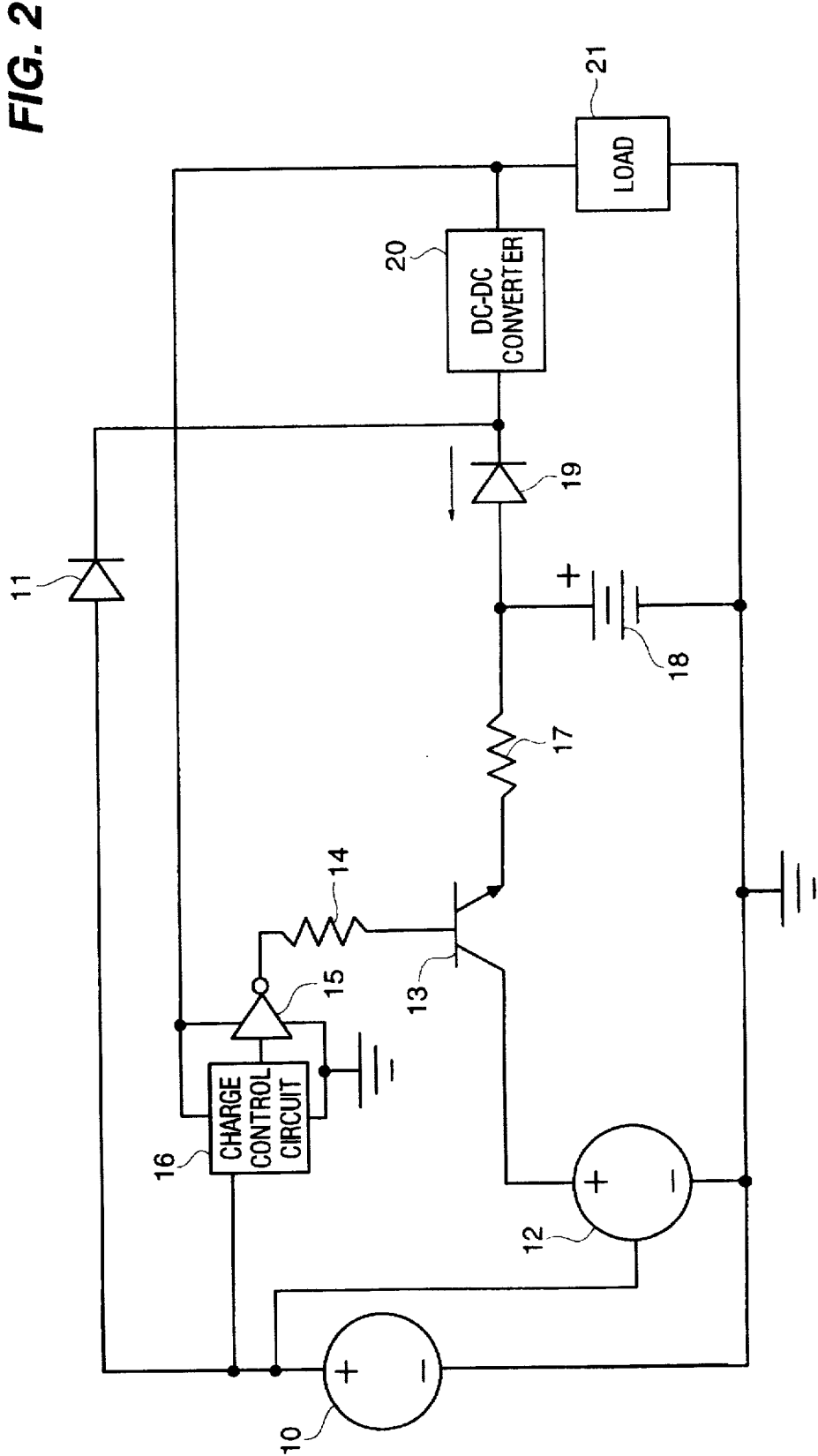
FIG. 2 is a circuit diagram of an embodiment of the present invention.

FIG. 2 illustrates a circuit of the present invention. Main power for the circuit is provided by main power source 10. Diode 11 ensures that current from the battery 18 does not flow back into main power source 10 in the event of a power failure.

In normal operation, main power source 10 provides the input potential to DC—DC converter 20. Discharge diode 19 is reversed biased during normal operation to prevent significant current flow in the reverse direction back to battery 18. DC—DC converter 20 converts its input voltage to an appropriate level to drive load 21. During a main power loss, battery 18 supplies the input voltage potential to DC—DC converter 20 to maintain operation of load 21. In this mode, battery 18 provides backup power to sustain operations through restoration of main power.

Power for the charging operation of battery 18 during normal operation is supplied by battery charge source 12. Battery charge source 12 is powered by main power source 10 and is a constant voltage source with a voltage equal to the desired fully charged battery voltage.

Transistor 13 and resistor 17 are in series between battery charging source 12 and battery 18 to control the charging process. When switched off, transistor 13 prevents battery 18 from discharging through battery charge source 12. When switched on, transistor 13 permits current to flow from battery charge source 12 to battery 18 through current limit resistor 17.

Transistor 13 is switched on when it is driven into saturation by current passing through base drive resistor 14. This current flow is provided by charge control circuit 16. Current is supplied to base drive resistor 14 when charge control circuit 16 senses that main power source 10 is present. When main power source 10 is below a predetermined threshold, charge control circuit 16 discontinues current flow through base ddve resistor 14 to switch transistor 13 off. Together, base drive resistor 14 and charge control circuit 16 comprise a transistor control circuit. Charge control circuit 16 is powered by the output voltage of DC—DC converter 20 so as to maintain operation of switching transistor 13 during main power loss. The structure and operation of charge control circuit is discussed below in additional detail with respect to FIG. 3.

One advantage of the circuit of the present invention as shown in FIG. 2 is that it charges battery 10 quickly as compared to prior circuits. Transistor 13, when saturated, has a very low forward voltage drop and a very low resistance as compared to the charging diode 4 of FIG. 1 used in the prior art. This provides battery charge source 12 with minimal resistance (other than that of current limiting resistor 17) to charging. The current flow to battery 18 is essentially linear throughout the charging process until the battery 18 is fully charged. Therefore charging is not slowed at the end of the charging operation due to increased resistance to charging current.

Another advantage of the circuitry of FIG. 2 is that it prevents overcharging of battery 18 by main power source 10. As discussed above, the prior art typified by FIG. 1 suffers from potential overcharging in normal operation due to reverse bias leakage through diode 7 into battery 6 of FIG. 1. In the prior art of FIG. 1, battery 6 provides the path of less resistance for the current flow as compared to the reverse biased charging diode 4. The excess current leakage through diode 7 of FIG. 1 therefore flows to battery 6 thereby overcharging the battery.

In the circuit of the present invention of FIG. 2, the excess leakage current is diverted through transistor 13 rather than battery 18 to thereby prevent overcharging of the battery 18. Transistor 13 provides minimal resistance to current flow when main power source 10 is above the predetermined threshold value. The conductive path through transistor 13 and battery charge source 12 is therefore less resistive to current flow than the path through battery 18. Leakage current through reverse biased diode 19 is therefore diverted through transistor 13 into battery charge source 12 rather than battery 18.

Figure 3:
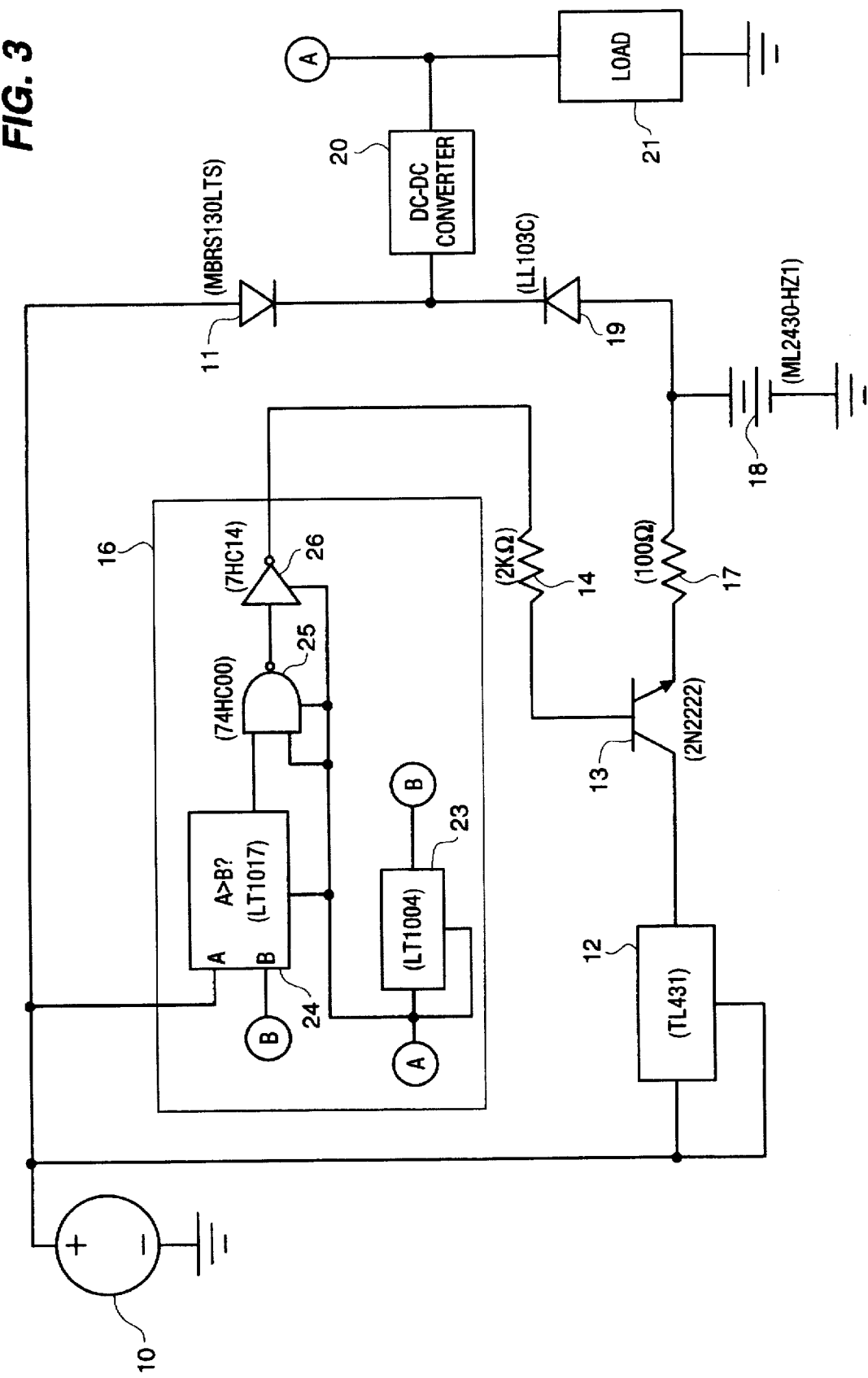
FIG. 3 is a circuit diagram of another embodiment of the present invention.

FIG. 3 illustrates a specific commercial embodiment of the charge control circuit 16 of the present invention and other portions of the circuit of the present invention shown in FIG. 2. Specific relevant part numbers are enclosed in parentheses. Manufacturers of such common components are well known to those of ordinary skill in the art. Main power for the circuit is provided by voltage source 10 which supplies voltage at 5.0 Volts. Diode 11 (part MBRS130LTS), diode 19 (part LL103C), resistor 14 (2 k$\Omega$), resistor 17 (100 $\Omega$), transistor 13 (part 2N2222), and battery charge source 12 (part TL431) all perform as described above to control normal operation of the circuit to charge lithium battery 18 and to operate DC—DC converter 20 and load 21.

The battery to be charged is lithium battery 18 (Sanyo part ML2430-HZ1). Power for the charging operation is derived from main power source 10 by battery voltage source 12 (also referred to herein as the charging potential source). Battery charge source 12 supplies voltage at 2.95 Volts.

When switched off, transistor 13 prevents lithium battery 18 from discharging through battery charge source 12. When switched on, transistor 13 permits current to flow from battery charge source 12 to battery 18 through current limit resistor 17.

Transistor 13 is switched on (a first state) when it is driven to saturation by current passing through base drive resistor 14. This current is provided by operation of charge control circuit 16. When the current is withdrawn by operation of charge control circuit 16, transistor 13 switches off (a second state).

Charge control circuit 16 is operated by power supplied as the output of DC—DC converter 20. Circuit path labeled "A" indicates the provision of operational power to the devices within charge control circuit 16. The output of DC—DC converter 20 is constant whether the circuits of FIG. 3 are operating under power supplied by main power source 10 or by battery 18 in backup mode.

Within charge control circuit 16, voltage converter 23 (part LT1004) provides a reference voltage derived from the output ("A") of DC—DC converter 20. As above for other circuits within charge control circuit 16, the reference voltage is derived from the main power source 10 or battery 18, whichever is presently available through DC—DC converter 20. The reference voltage (also referred to herein as a predetermined threshold value—approximately 4.6 Volts) is applied on the path labeled "B" as the B input to comparator 24 (part LT1017). The A input of comparator 24 is the main voltage source 10 potential (5 Volts in normal operation). Comparator 24 compares its A input voltage to its B input voltage. If the A input voltage is greater than the B input voltage, the comparator 24 output is driven high. Otherwise the comparator 24 output is driven low.

The output signal of comparator 24 is applied to one input of NAND gate 25 (part 74HC00) while the other input is driven high. The output of NAND gate 25 is therefore the negation of the comparison test performed by comparator 24. In other words, NAND gate 25 output is driven low if the main power source 10 is above the 4.6 Volt threshold and the output of NAND gate 25 is driven high if main power source 10 is below the 4.6 Volt threshold.

Inverter 26 (part 7HC14) inverts the output of NAND gate 25 and applies the resultant signal as the output of charge control circuit 16 to drive resistor 14 to drive the transistor 13 base to saturation, switching the transistor on, if the main power source 10 is operative. If the main power source 10 is inoperative, the output signal of charge control circuit 16 is low thereby switching off transistor 13.

As noted above, the devices within charge control circuit 16, namely: voltage converter 23, comparator 24, NAND gate 25, and inverter 26, are operable in normal operation and in backup power mode by use of the power output from DC—DC converter 20. The components of the charge control circuit 16 derive their operation power from the main power source 10 when the main power source 10 potential is above the reference potential on path "B." If the main power source is not present (below the reference threshold value), the components of charge control circuit 16 derive their operational power from the battery 18. Both source of operational power are provided to the circuits through DC—DC converter 20.

This circuit has all the advantages previously discussed above with respect to FIG. 2. It permits rapid charging of battery 18, and it prevents overcharging of the battery by diverting from battery 18 leakage current emanating from main power source 10 through reverse biased diode 19.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A circuit for charging a battery comprising:

a charging potential source which derives its power from a main power source potential;

a transistor connected in series between said charging potential source and said battery, wherein said transistor is switchable between a first state in which current linearly flows through said transistor from said charging potential source and said battery and a second state in which no current flows from said charging potential source and said battery; and a charge control device connected to said transistor to switch said transistor between said first state and said second state, wherein said charge control device derives operational power from said main power source potential when said main power source potential is above a predetermined threshold value, and wherein said charge control device derives operational power from said battery when said main power source potential is below said predetermined threshold value.

2. A circuit for charging a battery comprising:

a charging potential source which derives its power from a main power source potential;

a transistor connected in series between said charging potential source and said battery, wherein said transistor is switchable between a first state in which current flows through said transistor from said charging potential source and said battery and a second state in which no current flows from said charging potential source and said battery; and a charge control device connected to said transistor to switch said transistor between said first state and said second state, wherein said charge control device derives operational power from said main power source potential when said main power source potential is above a predetermined threshold value, and wherein said charge control device derives operational power from said battery when said main power source potential is below said predetermined threshold value, and wherein said charge control device comprises a comparator device which compares said main power source potential to said predetermined threshold value.

3. A circuit for charging a battery comprising:

a charging potential source which derives its power from a main power source potential;

a transistor connected in series between said charging potential source and said battery, wherein said transistor is switchable between a first state in which current flows through said transistor from said charging potential source and said battery and a second state in which no current flows from said charging potential source and said battery; and a charge control device connected to said transistor to switch said transistor between said first state and said second state, wherein said charge control device derives operational power from said main power source potential when said main power source potential is above a predetermined threshold value, and wherein said charge control device derives operational power from said battery when said main power source potential is below said predetermined threshold value, and wherein said predetermined threshold value is substantially fixed regardless of said main power source potential.

4. A circuit for charging a battery comprising:

a charging potential source which derives its power from a main power source potential;

a transistor connected in series between said charging potential source and said battery, wherein said transistor is switchable between a first state in which current flows through said transistor from said charging potential source and said battery and a second state in which no current flows from said charging potential source and said battery; and a charge control device connected to said transistor to switch said transistor between said first state and said second state, wherein said charge control device derives operational power from said main power source potential when said main power source potential is above a predetermined threshold value, and wherein said charge control device derives operational power from said battery when said main power source potential is below said predetermined threshold value, and wherein said predetermined threshold value is derived from said main power source potential when said main power source potential is above said predetermined threshold value, and wherein said predetermined threshold value is derived from said battery when said main power source potential is below said predetermined threshold value.

5. A circuit for charging a battery comprising:

a charging potential source which derives its power from a main power source potential;

a switching device connected in series between said charging potential source and said battery, wherein said switching device is switchable between a first state in which current linearly flows through said switching device from said charging potential source and said battery and a second state in which no current flows from said charging potential source and said battery; and charge control means connected to said switching device to switch said switching device between said first state and said second state, wherein said charge control device derives operational power from said main power source potential when said main power source potential is above a predetermined threshold value, and wherein said charge control device derives operational power from said battery when said main power source potential is below said predetermined threshold value.

6. A circuit for charging a battery comprising:

a charging potential source which derives its power from a main power source potential;

a switching device connected in series between said charging potential source and said battery, wherein said switching device is switchable between a first state in which current flows through said switching device from said charging potential source and said battery and a second state in which no current flows from said charging potential source and said battery; and charge control means connected to said switching device to switch said switching device between said first state and said second state, wherein said charge control device derives operational power from said main power source potential when said main power source potential is above a predetermined threshold value, and wherein said charge control device derives operational power from said battery when said main power source potential is below said predetermined threshold value, and wherein said charge control device comprises a comparator device which compares said main power source potential to said predetermined threshold value.

7. A circuit for charging a battery comprising:

a charging potential source which derives its power from a main power source potential;

a switching device connected in series between said charging potential source and said battery, wherein said switching device is switchable between a first state in which current flows through said switching device from said charging potential source and said battery and a second state in which no current flows from said charging potential source and said battery; and charge control means connected to said switching device to switch said switching device between said first state and said second state, wherein said charge control device derives operational power from said main power source potential when said main power source potential is above a predetermined threshold value, and wherein said charge control device derives operational power from said battery when said main power source potential is below said predetermined threshold value, and wherein said predetermined threshold value is substantially fixed regardless of said main power source potential.

8. A circuit for charging a battery comprising:

a charging potential source which derives its power from a main power source potential;

a switching device connected in series between said charging potential source and said battery, wherein said switching device is switchable between a first state in which current flows through said switching device from said charging potential source and said battery and a second state in which no current flows from said charging potential source and said battery; and charge control means connected to said switching device to switch said switching device between said first state and said second state, wherein said charge control device derives operational power from said main power source potential when said main power source potential is above a predetermined threshold value, and wherein said charge control device derives operational power from said battery when said main power source potential is below said predetermined threshold value, and wherein said predetermined threshold value is derived from said main power source potential when said main power source potential is above said predetermined threshold value, and wherein said predetermined threshold value is derived from said battery when said main power source potential is below said predetermined threshold value.

9. In combination:

a transistor connected between a charging power source and a battery, wherein charge current periodically flows through said transistor from said charging power source to said battery; and a diode connected between said battery and a load, wherein said transistor periodically shunts leakage current from the diode away from the battery.

10. In combination:

a main power source that provides power to a load;

a charging power source that provides power to a battery;

a diode coupled between said battery and said load; and a transistor coupled between said charging power source and said battery, wherein current flows through said transistor from said diode to said charging power source.

11. A dual-function electrical device that provides current to a battery when the battery is not charged, and shunts current away from the battery when the battery is charged.

12. The device of claim 11, wherein the dual-function electrical device is a transistor.

13. A method for maintaining a battery, comprising the steps of:

providing current from a power source to the battery through an electrical device during a first cycle; and shunting current away from the battery to the power source through the electrical device during a second cycle.

14. The method of claim 13, wherein the dual-function electrical device is a transistor.

* * * * *